Sept. 20, 1960  M. B. RASMUSSON  2,953,105
FROZEN CONFECTION MACHINE STICK INSERTER
Filed Dec. 1, 1958  3 Sheets-Sheet 1
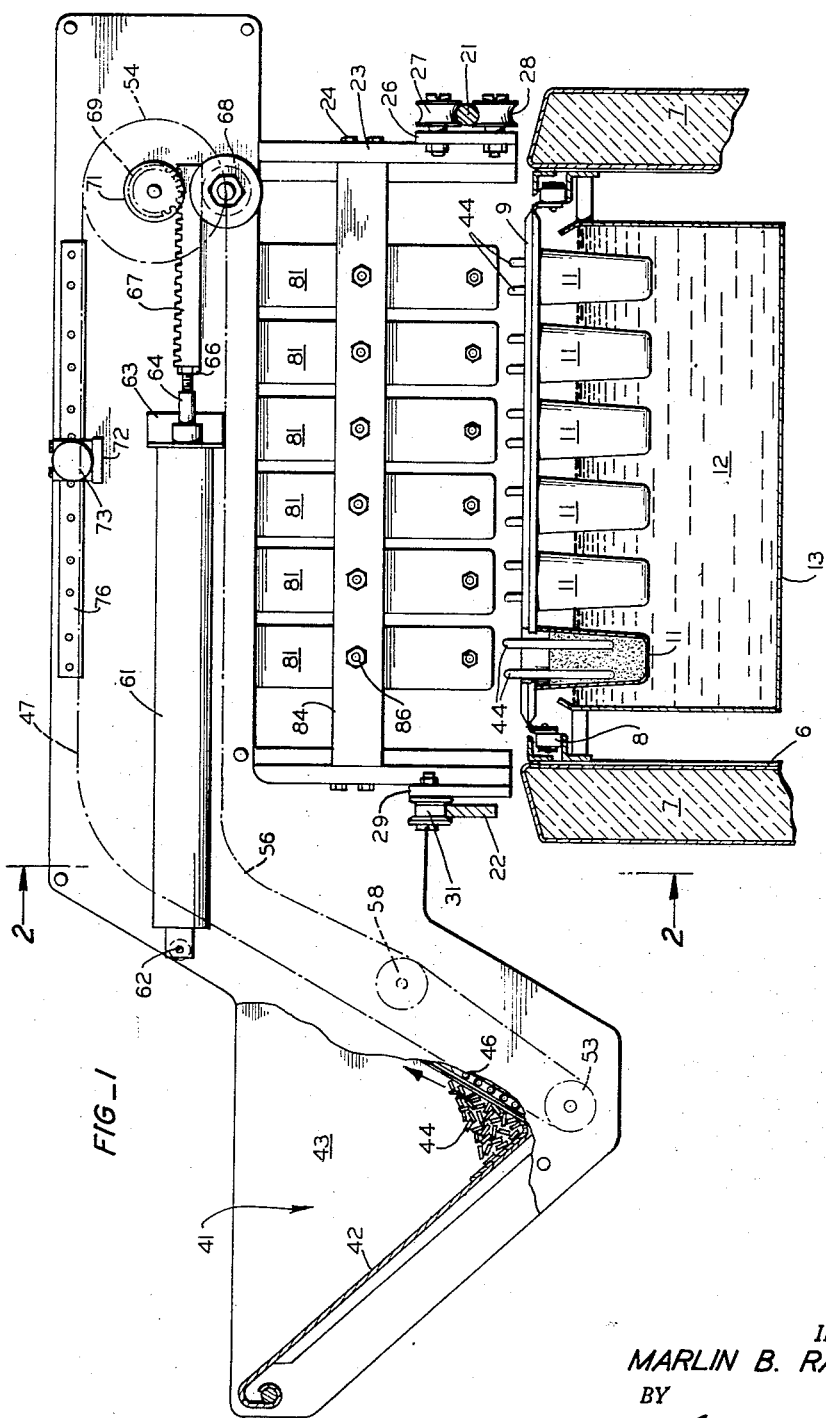
FIG_1
INVENTOR.
MARLIN B. RASMUSSON
BY
Lothrop & West
ATTORNEYS Sept. 20, 1960 — M. B. RASMUSSON — 2,953,105
FROZEN CONFECTION MACHINE STICK INSERTER
Filed Dec. 1, 1958 — 3 Sheets-Sheet 2
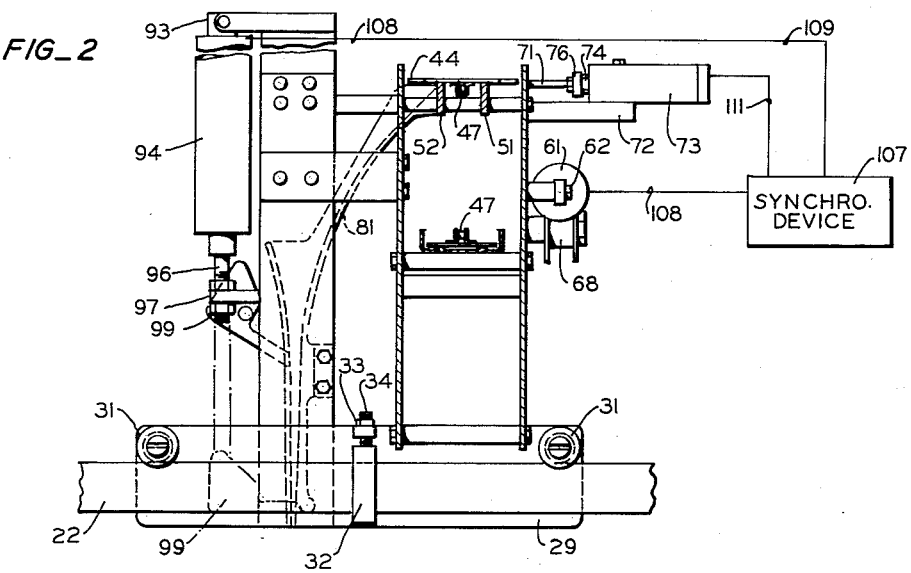
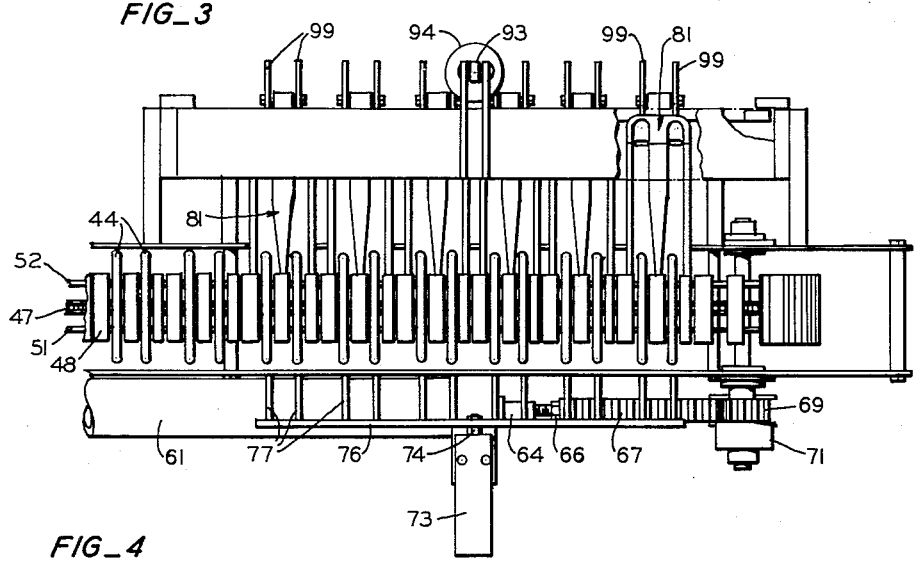
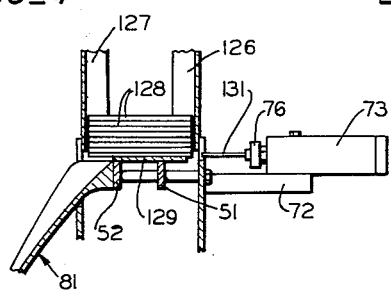
INVENTOR.
MARLIN B. RASMUSSON
BY
Lothrop & West
ATTORNEYS

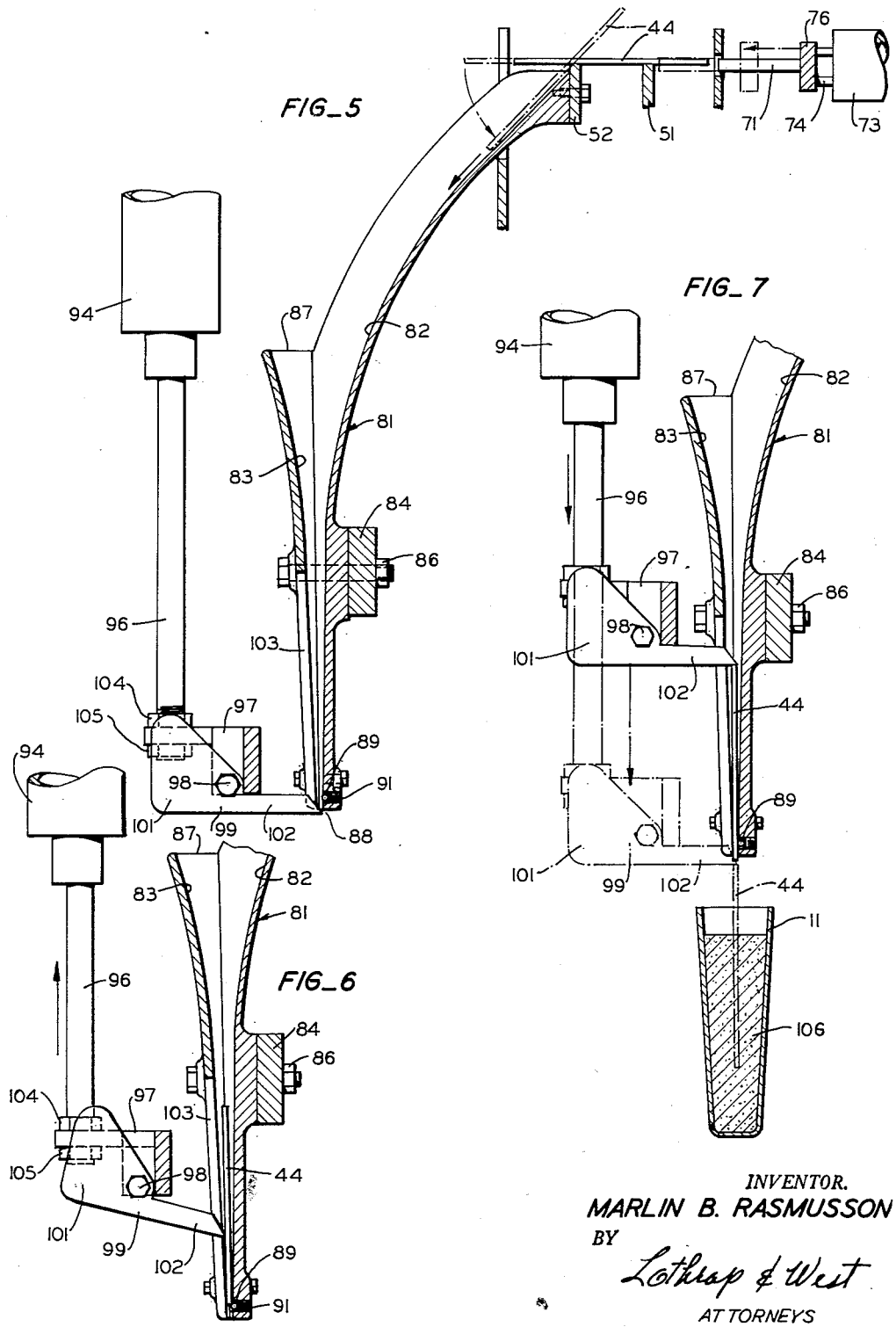

United States Patent Office 2,953,105
Patented Sept. 20, 1960

2,953,105
FROZEN CONFECTION MACHINE STICK INSERTER

Marlin B. Rasmusson, 6601 Elvas Ave., Sacramento 19, Calif.

Filed Dec. 1, 1958, Ser. No. 777,518

8 Claims. (Cl. 107—8)

My invention relates primarily to mechanisms useful in producing frozen confections on a stick. Such confections usually include a block of ice cream or water ice associated with a partially contained stick useful as a handle. In a copending application of mine entitled "Frozen Confection Machine" filed March 12, 1959, with Serial No. 799,005, there is disclosed a machine for forming such blocks of confection by a freezing process. This includes the operation of inserting wooden paddles or sticks into the partially frozen confection with a portion of the stick enclosed in the finally finished confection and the remainder of the stick projecting therefrom. This application is especially concerned with mechanism that inserts the sticks into the confections at an appropriate point in the manufacturing cycle.

The primary object of the copending application and of this application is to provide a simple, directly operating frozen confection machine with a relatively small number of simple parts.

It is particularly an object of this application to provide a stick inserter which will transfer a plurality of sticks (whether in released bundles or in random confinement), marshal a predetermined number of the sticks in order at an appropriate time in the operation of the machine, and insert the sticks in the desired fashion into a receptive group of at least partially frozen confections.

Another object of the invention is to provide a stick inserter effective to utilize sticks disposed at random in a container.

Another object of the invention is to provide a stick inserter effective to orient a plurality of sticks and introduce them simultaneously into a corresponding plurality of substantially frozen confections.

Another object of the invention is to provide a stick inserter in which an occasional failure of the mechanism can readily be compensated for by a supervisory operator.

A still further object of the invention is to provide a stick inserter which can be operated in synchronism and in proper relationship with a frozen confection machine.

An additional object of the invention is to provide a stick inserter which is useful as a unit by itself so that it can be positioned as desired on a frozen confection machine.

Another object is to provide in general a greatly improved stick inserter for a frozen confection machine.

Other objects, together with the foregoing, are attained in the embodiments of the invention described in the accompanying description and illustrated in the accompanying drawings, in which:

Figure 1 is a transverse cross-section through a frozen confection machine showing the stick inserter of the invention mounted thereon; the inserter itself being shown substantially in side elevation with a portion broken away to disclose the interior construction of the stick hopper.

Figure 2 is a cross-section, the plane of which is indicated by the line 2—2 of Figure 1.

Figure 3 is a plan of the mechanism shown in Figure 1, the hopper being omitted.

Figure 4 is a cross-section somewhat comparable to Figure 2 and showing a modified form of stick feeding mechanism.

Figure 5 is an enlarged view somewhat like Figure 2 but with various portions omitted and showing the mechanism in the act of discharging a stick from the holding position.

Figure 6 is a fragmentary view comparable to Figure 5 and showing a stick in releasably retained position.

Figure 7 is a view comparable to Figures 5 and 6 and showing the mechanism in stick ejecting condition.

While the stick inserter is adapted for use in connection with different forms of frozen confection machines it is especially adapted for use with a machine as shown in my above identified copending application. This includes a frame 6 having insulated walls 7 thereon and carrying a conveyor 8 provided with cross bars 9 at appropriate intervals. Each of the cross bars carries in transverse series a plurality of confection molds 11 of the desired shape. These are designed to be partially immersed in brine 12 contained in a tank 13 supported on the frame 6.

In the operation of this mechanism the molds 11 are partially filled by a suitable means and are advanced through the brine 12 in a succession of steps. As the molds advance with the liquid confection therein, the confection gradually congeals. This may occur at any one of several points along the conveyor 8 since the nature of the mixture being frozen varies from time to time, the speed of advance of the conveyor 8 may vary, the temperature of the brine 12 is sometimes altered and the ambient temperature likewise varies.

In accordance with the invention there is preferably provided a means for supporting a stick inserting unit at any desired location within wide limits along the direction of advance of the conveyor 8. For that reason the frame 6 is appropriately augmented by a support rod 21 along one side and a support bar 22 along the other side parallel to the direction of advance of the conveyor chain 8. Supported on the rod 21 and the bar 22 is a movable inserter frame 23. This is preferably made up of a number of simple structural shapes fastened together at appropriate places by machine screws 24 or the like. The frame 23 includes a longitudinal plate 26 at one side carrying a plurality of pairs of concave rollers 27 and 28 partially encompassing the rod 21. The rollers insure that the frame 23 is movable in a longitudinal direction and is constrained against transverse or vertical movement. As so far described, the frame 23 can also be rotated about the center of the rod 21 in a generally vertical arc.

At its other side, the frame 23 carries a longitudinal plate 29 on which are pivotally mounted a pair of upper rollers 31 resting upon the bar 22, the rollers 31 being readily lifted from the bar 22 if necessary but supporting a portion of the weight of the stick inserter frame. So that the frame 23 can be temporarily held immovably in any adjusted longitudinal position, there is provided a clamp 32 loosely surrounding the bar 22 and movable in a vertical direction by means of a nut 33 operating on a threaded rod 34 secured to the clamp 32. When the nut 33 is loose, the clamp 32 drops sufficiently to slide freely along the bar 22. When the nut 33 is tightened, the clamp 32 is lifted and the bottom portion of the clamp presses against the bottom of the bar 22 and, with the rollers 31, holds the frame 23 immobile.

On an extension of the frame 23, preferably at one side of the wall 7 of the main frame 6, there is provided a stick hopper 41. This is a substantially V-shaped container having a solid inclined bottom wall 42 and a pair of solid side walls 43. The container 41 is of a capacity to receive a large number of sticks 44 of the particular size and shape to be inserted into the frozen confections. These sticks are received from the supplier in two ways. If they come in singly stacked and banded bundles they are relatively expensive. If they are received in bulk and in random positions, although usually aligned in the same general direction, they are considerably cheaper. The hopper 41 is designed to receive unstacked sticks purchased without banding although they are generally packed so as to be oriented in one direction or parallel. These sticks, as received, are simply dumped into the hopper 41 and lie substantially as shown in Figure 1 to any selected height therein.

To complement the wall 42 of the hopper 41 and to afford a means for extracting sticks from the hopper in appropriate order for future use, there is preferably provided on the frame 23 a link chain 46 made up of a central run 47 with a plurality of appropriately spaced slats 48 extending transversely thereof. The slats are spaced apart in a longitudinal direction slightly more than the width of the individual sticks 44. The spacing of the slats 48 is not necessarily entirely even since sometimes more than one stick is utilized for each confection. That is the instance shown herein in which two sticks are utilized for each of the molds 11. Under some circumstances but one stick is utilized for each mold and in that instance the single stick is inserted in the mold substantially on the center line thereof. In the present instance the slats 48 are so spaced as to position the successive sticks 44 in pairs for insertion of a pair into each one of the molds 11.

The sticks 44 are supported in part between the slats 48 on the chain 46 but more particularly slide on a pair of appropriately contoured rails 51 and 52. These extend from near the bottom of the hopper 41 upwardly on an incline and across the top of the frame 23. The chain itself has its upper run trained in substantially the proper direction partly by the slats 48 resting on the rails 51 and 52 and partly in that the chain passes around a sprocket 53 near the bottom of the hopper 41 and about a larger sprocket 54 near the outboard end of the top of the frame 23. The return run of the chain has appropriate guide rails (not shown) in the area 56 and passes over an idler sprocket 58 adjustable to establish the proper tension in the chain. Since the slats 48 ride upon the rails 51 and 52 the upper run of the chain always has the appropriate contour while the lower run can have some slack.

In order appropriately to advance the chain there is provided a mechanism which does so in successive increments so that the chain advances a certain distance for each cycle of the machine. To that end there is mounted on the frame extension 23 a pneumatic jack 61 having one end mounted by a pin 62 and mounted at the other end by a bracket 63. The jack 61 is preferably of the type having a hydraulic control, as shown in my Patent No. 2,838,140, issued June 10, 1958. Projecting from the jack cylinder is a piston rod 64 having an adjustable connection 66 to a rack 67. The rack is guided in a rectilinear path by a roller 68 and is in engagement with a pinion 69. The pinion is not directly connected to the shaft of the sprocket 54 but rather is joined thereto through a unidirectional or overrunning clutch 71.

With this arrangement, when the rack 67 is in the position shown in Figure 1 and the jack 61 is put under pressure at the left-hand end, the piston rod 64 is projected and the rack 67 advances toward the right. This rotates the pinion 69 in a counter-clockwise direction. Because of the overrunning or unidirectional clutch 71, this does not have any effect on the sprocket 54 which remains stationary due to the inertial and frictional load thereon. When the connections to the jack 61 are reversed, and hydraulic pressure is exerted on the right-hand end of the cylinder, then the piston rod 64 is withdrawn into the cylinder, the rack 67 is translated to the left in Figure 1, the pinion 69 is rotated in a clockwise direction and the unidirectional clutch engages the pinion with the shaft on which the sprocket 54 is mounted and so rotates the sprocket in unison with the pinion 69 throughout the selected part of one of more turns.

The rotation of the sprocket 54 produces a corresponding advance of the chain 46 through a predetermined length. This length is sufficient so that enough spaces between the slats 48 filled with sticks are positioned to take care of the number of molds 11 in the cross bar 9 subposed in the machine. In the present instance there are six molds arranged crosswise on the subjacent bar 9 and since each mold requires two sticks the chain is advanced sufficiently so that twelve sticks from the hopper are moved into a horizontal, holding position. The random hopper sticks drop between and are engaged between the various slats. As the chain is advanced each of the spaces between the slats is in effect a receptacle for one stick. The chain advances each cycle for a length equivalent to twelve sticks. Thus, the sticks are advanced in groups of twelve from the hopper 41 to the upper portion of the frame 23.

In this upper holding position at the end of each step of chain motion, twelve sticks are all arranged in a horizontal plane extending across the frame with the sticks lined up parallel to each other and having about the same fore and aft location. The location of upper run of the chain in the central top part of the frame 23 is referred to as a holding station. The chain 46 is periodically stopped with twelve sticks at the holding station.

To eject the sticks simultaneously from that station there is provided an ejector mechanism mounted on a bracket 72 projecting from the frame 23. On the bracket 72 is provided a pneumatic jack 73 having a piston rod 74 projecting therefrom and joined to a cross bar 76. A plurality (twelve) of ejector pins 77 arranged parallel to each other in a horizontal plane extend from the cross bar 76 substantially in axial or linear registry with a plurality of arrested sticks at the holding station. When the jack cylinder 73 is energized with pressure fluid at the right end, as seen in Figure 2, the cross bar 76 is advanced and the pins 77 are similarly advanced and dislodge the corresponding sticks 44 from the spaces between the slats 48 on the chain. After dislodgement has occurred, the pressure in the cylinder 73 is reversed and the ejector pins 77 are retracted so that the chain can be advanced for the next cycle.

The simultaneously dislodged sticks 44 are forced across the support rails 51 and 52 and become overbalanced on the rail 52 to fall by gravity into a plurality of parallel chutes 81. As especially seen in Figures 5, 6 and 7, each of the chutes 81 comprises an inner trough 82 with conveying side walls and having an arcuate configuration leading from an approximately horizontal position of the slats at the holding station to a vertical position at the lower end of the chute. The chute also includes an outer channel section 83 secured to the inner channel section and to a support member 84 by an appropriate fastening 86.

Since the inner member 82 and the outer member 83 diverge they leave an opening 87 for inspection. If by chance the chain at any time does not pick up a stick at any one of the intervals between the chain slats so that the ejector has no stick to eject into the particular chute 81, an operator can observe the absence of a stick in the upper portion of the inner chute member 82 and can by hand insert a substitute stick through the opening 87 for gravital introduction into the chute.

The chutes 81 are preferably made as separate parts of the mechanism and are bolted in position as shown in order that they can be changed from time to time if the number or location of sticks utilized is to be changed or if the cross-sectional shape or size of the sticks is to be substantially varied.

Although the sticks enter the chutes easily and substantially simultaneously and fall by gravity from their approximate horizontal positions near the holding station to a substantially vertical position near the outlet of the chutes, they are preferably releasably retained in the chutes and do not fall directly therethrough. For this reason each of the chutes near its outlet 88 at the bottom end is provided with a yieldable detent such as a projecting retainer 89. This can be simply a friction shoe, conveniently a slightly projecting O-ring, or, as shown, comprises a captive spring-pressed ball held in an adjusting screw 91. The effect of the retainer 89 can be adjusted. The detent or retainer arrests a falling stick and retains it in the chute temporarily.

In accordance with the invention means are provided for simultaneously ejecting a plurality of sticks from the various parallel chutes and introducing such sticks into the molds 11 subjacent to the chutes 81.

As especially illustrated in Figure 2, the frame 23 carries a top bracket 93 on which a pneumatic jack 94 is mounted. The jack has a piston rod 96 secured to a cross bar 97. At appropriate intervals on the cross bar 97 there are provided pivot supports 98 for latch ejectors 99. These ejectors have an extra mass 101 on one side of the pivot 98 and have a relatively narrow finger 102 on the other side of the pivot. Unless dislodged, the fingers 102 remain approximately horizontal since the mass 101 impells the fingers 102 to rest against the lower edge of the cross bar 97. In the lower position of the piston rod 96, the point of each finger 102 is just below the outlet of the associated chute. The outer section 83 of the chute in its lower portion has a longitudinal, vertical slot 103. This is narrower than the width of the stick or of the chute so that the edges of the slot lie snugly alongside the finger 102 in substantially all of its positions. Through this slot 103 the finger can enter into the interior of the chute.

When pneumatic pressure is introduced into the lower end of the jack 94, the rod 96 is lifted, lifting the cross bar 97 and all twelve of the fingers 102. These fingers are rotated clockwise by encountering the sticks already lodged in the lower portion of the chutes adjacent the detents 89. The fingers 102 swing out of the way of the sticks as they rise as illustrated in Figure 6. After the jack 94 has reached the upper end of its stroke the pressure therein is reversed and is effective upon the upper end of the piston rod 96. This rod then descends.

As shown in Figure 7, at the beginning of the descending movement the finger 102 is rocked counter-clockwise by the mass 101 and enters well into the chute above the upper end of the stick contained therein. Further movement downwardly of the rod 96 overcomes the resistance of the retainer 89 and forces the stick out of the outlet of the chute. Usually the material of the stick is relatively soft such as wood or plastic or soft metal. Even though the retainer 89 does not itself yield greatly the material of the stick is slightly deformed. The stick is positively expelled even against some restraint.

Since all of the fingers 102 descend simultaneously, as they are all attached to the cross bar 97, all of the sticks are simultaneously ejected from all of the chutes and penetrate into the partially frozen mix in the subjacent molds 11. The sticks are introduced into the partially frozen mix to an extent or distance determined by the length of stroke of the rod 96. To adjust the extent of penetration, the rod 96 is fastened to the cross bar 97 by an adjusting mechanism including nuts 104 and 105. When the rod 96 has reached the bottom of its stroke, the pressure in the jack 94 is reversed and the rod 96 is returned toward its uppermost position ready for a subsequent operation. During this time the series of molds 11 is advanced and the mechanism is available for a subsequent cycle.

In order that the chain advancing mechanism, especially the jack 61, and the stick advancing mechanism, especially the jack 73, and the stick ejecting mechanism, especially the jack 94, are appropriately operated in timed relationship to each other, there is provided a generally indicated synchronizing device 107 which is connected by pneumatic lines 108, 109 and 111 to the various jacks. This mechanism 107 is effective to establish pneumatic connections to the various jacks so as to advance the chain, operate the ejector pins 77 and operate the ejector fingers 102 in properly timed relationship with each other. Also, as disclosed in the above identified copending application, the synchronizing mechanism 107 is connected to another driving unit (not shown) on the frame 6 so that the operation of the stick inserter is properly timed with the advancing steps of the conveyor 8.

With this mechanism the stick inserter can be mounted on the main frame and moved longitudinally to any desired position depending largely upon the extent of freezing of the mix in the molds and can then be easily clamped in place. If the stick mechanism is to be moved out of the way, that can readily be accomplished by releasing the clamp 32. The mechanism takes sticks at random, although generally aligned in the same direction, and feeds them in appropriate groups to a holding station from which the sticks in an appropriate number are simultaneously discharged through chutes to change them from a generally horizontal position to a generally vertical position. The sticks are retained in the parallel chutes by a yieldable retaining mechanism until they are simultaneously ejected into the mix in a row of subjacent molds. The parts are returned to their original positions ready for subsequent operation in time with the operation of the frozen confection machine as a whole.

As a variation, shown in Figure 4, it is possible to adapt the mechanism to utilize sticks which are supplied in tied bundles only one stick wide although many sticks high. At present these are costly but under some circumstances are effectively utilized. In this variation the mechanism is substantially as before except that the hopper 41, the chain 46 and the chain driving mechanism such as the jack 61 are dispensed with. Rather, for each row of sticks to be supplied, the upper part of the frame 23 carries supports 126 and 127 constituting individual magazines in which the sticks 128 are piled. Usually, the sticks are put into the magazines still banded, and the bands are then stripped off, leaving the sticks in individual piles at the appropriate stations. The sticks 128 rest upon a stationary guide platform 129 suitably grooved so that the sticks remain in proper orientation and in alignment with plunger pins 131 substantially identical with the plunger pins 77 and similarly connected to the cross bar 76 of the jack 73. Also the chutes 81 are connected precisely as before and the remaining portions of the mechanism are exactly as previously described.

In this variant mechanism, the jack 73 is energized at the proper time so that the pins 131 abut the ends of the lowermost sticks 128 within the magazines 126 and 127 and eject the lowermost ones of the sticks. The dislodged sticks fall into the chutes 81. As the pressure upon the jack 73 is reversed, the plunger pins 131 are simultaneously retracted and the superposed sticks 128 drop the thickness of one stick to rest with the then lowermost stick on the platform 129. In this instance the jack 73 need be synchronized only with the jack 94 since the jack 61 is eliminated. The arrangement is such that the device can be adapted quickly for use as shown in Figure 4 with banded sticks or as shown in Figure 1 with random sticks. In fact, if desired, the chain 46 can be left in a stationary position and in that instance constitutes the equivalent of the channel supports 129. In this way a user can utilize the machine for a short run with banded sticks and by re-energizing the chain and the jack 61 can subsequently operate with the sticks loaded into the hopper at random.

What is claimed is:

1. A frozen confection machine stick inserter comprising a frame, a chute on said frame curving from a substantially horizontal inlet to a substantially vertical outlet, means on said frame for introducing a stick into said inlet, means for arresting said stick adjacent said outlet, and means on said frame for overcoming said arresting means and expelling said stick from said outlet.

2. A frozen confection machine stick inserter comprising a frame, a chute on said frame curving from a substantially horizontal inlet to a substantially vertical outlet, means on said chute forming a yieldable stop blocking said outlet, first means on said frame for pushing a stick through said inlet to fall through said chute until arrested by said stop, second means on said frame for pushing said arrested stick past said stop and through said outlet, and means for synchronizing said first and said second pushing means.

3. A frozen confection machine stick inserter comprising a frame, first means on said frame for holding a stick in horizontal position, second means on said frame for holding a stick in vertical position, a chute for guiding a stick from said first means to said second means, means for propelling a stick from said first means to said chute, means on said frame for supporting a confection mold adjacent said second means, means for expelling said stick from said second means and advancing said stick into said mold, and means for synchronizing said propelling means and said expelling means.

4. A frozen confection machine stick inserter comprising a frame, first means on said frame for holding a plurality of sticks in line in a horizontal position, second means on said frame for holding a plurality of sticks in line in a vertical position, chutes for guiding said sticks from said first means to said second means, means for simultaneously propelling said plurality of sticks from said first means to said chutes, means on said frame for supporting a plurality of confection molds in line adjacent said second means, means for simultaneously expelling said plurality of sticks from said second means and advancing said plurality of expelled sticks into said molds, and means for synchronizing said propelling means and said expelling means.

5. A frozen confection machine stick inserter for planar sticks comprising a frame, means for simultaneously positioning a plurality of sticks in line with the plane of said sticks in a first horizontal position, means for simultaneously holding a plurality of sticks in line with the plane of said sticks in a second vertical position, means for simultaneously transferring said plurality of sticks from said first horizontal position in said positioning means to said second vertical position in said holding means, and means for subsequently discharging said plurality of sticks simultaneously from said holding means.

6. A frozen confection machine comprising a frame, means on said frame for containing a plurality of sticks, a chain on said frame and movable in engaging relation with a stick within said containing means, means for advancing said chain from said containing means to a holding station with a stick thereon, means on said frame at said holding station for dislodging said stick to fall by gravity, a chute on said frame for guiding said dislodged stick to an inserting station, means on said frame for positioning a confection mold adjacent said inserting station, and means on said frame for moving said stick from said inserting station into said confection mold.

7. A frozen confection machine stick inserter comprising a frame, a stick hopper on said frame, a stick engaging chain movable in engaging relation with sticks in said hopper, means for moving said chain intermittently from said hopper to a holding station on said frame, a set number of chutes at said holding station, means on said frame at said holding station for simultaneously discharging a set number of sticks from said chain into said chutes while said chain is stopped, means for releasably holding said set number of sticks adjacent the outlet of said chutes, and means on said frame for simultaneously ejecting said set number of sticks from the outlet of said chutes.

8. A frozen confection machine stick inserter comprising a frame, a stick hopper on said frame, a stick engaging chain movable in engaging relation with sticks in said hopper, means for moving said chain intermittently from said hopper to a holding station on said frame, a plurality of parallel chutes at said holding station, means on said frame at said holding station for simultaneously discharging a plurality of sticks from said chain into said chutes, means for releasably retaining said plurality of sticks adjacent the outlet of said chutes, and means on said frame for simultaneously ejecting said plurality of sticks from the outlet of said chutes.

References Cited in the file of this patent

UNITED STATES PATENTS

| | | |
|---|---|---|
| 1,984,724 | Birr | Dec. 18, 1934 |
| 2,101,570 | Bolen | Dec. 7, 1937 |
| 2,110,923 | Taylor | Mar. 15, 1938 |
| 2,591,033 | Washburn | Apr. 1, 1952 |
| 2,700,347 | Gram et al. | Jan. 25, 1955 |